United States Patent
Ikeuchi et al.

(10) Patent No.: US 8,532,926 B2
(45) Date of Patent: Sep. 10, 2013

(54) MAP INFORMATION PROCESSING DEVICE

(75) Inventors: Tomoya Ikeuchi, Tokyo (JP); Makoto Mikuriya, Tokyo (JP); Masaharu Umezu, Tokyo (JP); Yasushi Kodaka, Tokyo (JP); Kosei Uchino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 13/131,697

(22) PCT Filed: Nov. 10, 2009

(86) PCT No.: PCT/JP2009/005984
§ 371 (c)(1),
(2), (4) Date: May 27, 2011

(87) PCT Pub. No.: WO2010/095193
PCT Pub. Date: Aug. 26, 2010

(65) Prior Publication Data
US 2011/0231089 A1    Sep. 22, 2011

(30) Foreign Application Priority Data
Feb. 17, 2009  (JP) ................................ 2009-033898

(51) Int. Cl.
*G01C 21/34*   (2006.01)
*G08G 1/123*   (2006.01)

(52) U.S. Cl.
USPC .......... 701/533; 701/408; 701/409; 701/410; 701/416; 701/532

(58) Field of Classification Search
USPC ............... 701/408, 409, 410, 416, 417, 431, 701/532, 533
See application file for complete search history.

(56) References Cited

U.S. PATENT DOCUMENTS

| | | | | |
|---|---|---|---|---|
| 5,991,686 A * | 11/1999 | Oguro et al. | ................... | 701/115 |
| 6,108,602 A * | 8/2000 | Bairamis | ....................... | 701/431 |
| 6,173,232 B1 * | 1/2001 | Nanba et al. | ................... | 701/446 |
| 6,411,894 B2 * | 6/2002 | Yamamoto et al. | ........... | 701/409 |
| 7,302,339 B2 * | 11/2007 | Gray | ............................... | 701/36 |
| 7,933,699 B2 * | 4/2011 | Hara et al. | ........................ | 701/36 |
| 8,103,442 B2 * | 1/2012 | Akita et al. | .................... | 701/457 |

(Continued)

FOREIGN PATENT DOCUMENTS

| | | |
|---|---|---|
| JP | 2001-33261 A | 2/2001 |
| JP | 2001-165680 A | 6/2001 |

(Continued)

*Primary Examiner* — Khoi Tran
*Assistant Examiner* — Rachid Bendidi
(74) *Attorney, Agent, or Firm* — Birch, Stewart, Kolasch & Birch, LLP

(57) ABSTRACT

A map information processing device includes a map information storage unit 23 for storing map information, a sensor information input unit 22 for inputting sensor information used for calculation of a current position, a navigation processing unit 25 for calculating the current position by using the map information read from the map information storage unit, and the sensor information inputted from the sensor information input unit, and for, when determining that the above-mentioned calculated current position is in a tunnel shown by the read map information, and when this tunnel branches into tunnel sections at a forward position, calculating a distance to each of all tunnel end points to generate a map image about a map including this calculated distance, and an output control unit 26 for outputting the map image generated by the navigation processing unit.

3 Claims, 8 Drawing Sheets

(56) References Cited

U.S. PATENT DOCUMENTS

| | | | |
|---|---|---|---|
| 8,229,623 B2* | 7/2012 | Maki | 348/148 |
| 2001/0007967 A1* | 7/2001 | Yamamoto et al. | 701/208 |
| 2007/0176928 A1* | 8/2007 | Matsumoto et al. | 345/427 |
| 2007/0250265 A1* | 10/2007 | Mori | 701/211 |
| 2008/0167810 A1* | 7/2008 | Wildervanck | 701/211 |
| 2008/0262722 A1* | 10/2008 | Haag et al. | 701/208 |
| 2010/0023254 A1* | 1/2010 | Machino | 701/201 |
| 2010/0063720 A1* | 3/2010 | Machino | 701/201 |
| 2010/0217522 A1* | 8/2010 | Ando et al. | 701/208 |
| 2010/0332121 A1* | 12/2010 | Okude et al. | 701/201 |
| 2011/0231090 A1* | 9/2011 | Ikeuchi et al. | 701/201 |
| 2011/0231093 A1* | 9/2011 | Ikeuchi et al. | 701/208 |

FOREIGN PATENT DOCUMENTS

| | | |
|---|---|---|
| JP | 2003-240575 A | 8/2003 |
| JP | 2007-163274 A | 6/2007 |
| JP | 2008-96346 A | 4/2008 |

\* cited by examiner

MAP INFORMATION PROCESSING DEVICE

FIELD OF THE INVENTION

The present invention relates to a map information processing device which is applied to a navigation device, for example, and which processes map information. More particularly, it relates to a technology of presenting information about tunnel exits while a vehicle is traveling through a tunnel branching into tunnel sections therewithin.

BACKGROUND OF THE INVENTION

A conventional navigation device displays a tunnel in a form different from that in which roads are displayed on a map while a vehicle equipped with the navigation device is traveling through the tunnel. However, because the remaining distance of the tunnel is not displayed on the map, the driver may have an uncertain, insecure feeling resulting from being unable to know information about the distance to the tunnel exit while the vehicle is traveling through a long tunnel.

As a technology of outputting information about a tunnel, patent reference 1 discloses a navigation device that can notify the driver about a relationship between the current position and an evacuation route promptly when the driver encounters an accident or the like in a tunnel. When the driver encounters an accident or the like in a tunnel, this conventional navigation device detects the emergency situation, such as an accident, according to the user's command or automatically, and informs the relationship between the current position and an emergency exit to the user.

RELATED ART DOCUMENT

Patent Reference

Patent reference 1: JP,2008-96346,A

SUMMARY OF THE INVENTION

However, because the navigation device disclosed by above-mentioned patent reference 1 does not present any information about tunnel exits to the driver during normal travel of the vehicle through any tunnel, the navigation device cannot remove an uncertain, insecure feeling, as mentioned above, which the driver may have.

The present invention is made in order to solve the above-mentioned problem, and it is therefore an object of the present invention to provide a map information processing device that can remove an uncertain, insecure feeling which the driver may have when driving through a tunnel.

In order to solve the above-mentioned problem, a map information processing device in accordance with the present invention includes: a map information storage unit for storing map information; a sensor information input unit for inputting sensor information used for calculation of a current position; a navigation processing unit for calculating the current position by using the map information read from the map information storage unit, and the sensor information inputted from the sensor information input unit, and for, when determining that the above-mentioned calculated current position is in a tunnel shown by the read map information, and when this tunnel branches into tunnel sections at a forward position, calculating a distance to each of all tunnel end points to generate a map image about a map including this calculated distance; and an output control unit for outputting the map image generated by the navigation processing unit.

Because the map information processing device in accordance with the present invention is constructed in such a way as to, when the vehicle has entered a tunnel, display the distance to each of all tunnel exits even though the tunnel is a complicated one branching into tunnel sections, the psychological burden on the driver resulting from being unable to know the distance to any tunnel exit can be reduced.

EMBODIMENTS OF THE INVENTION

Hereafter, in order to explain this invention in greater detail, the preferred embodiments of the present invention will be described with reference to the accompanying drawings.

Embodiment 1

Figure 1:
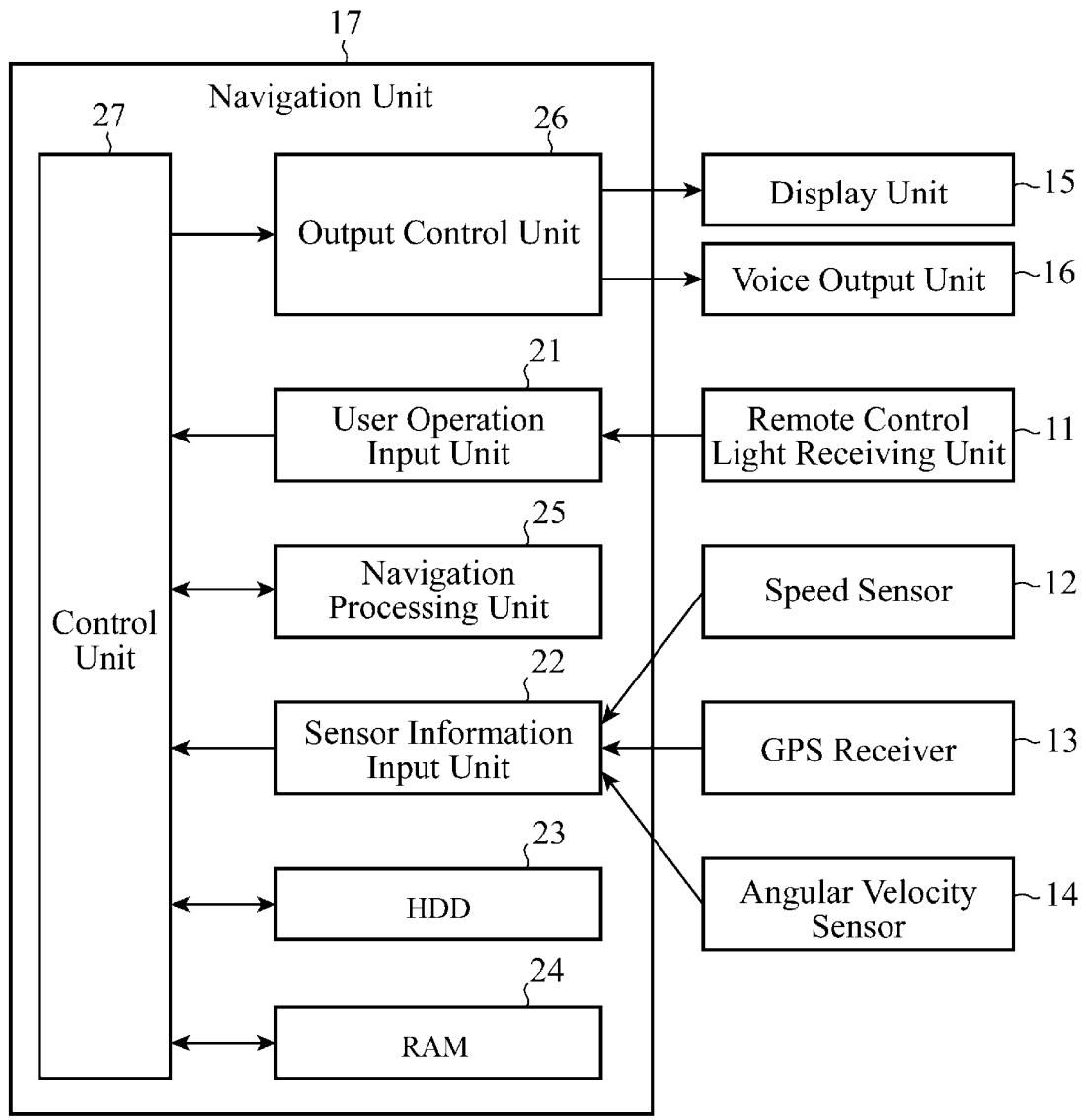
FIG. 1 is a block diagram showing the structure of a map information processing device in accordance with Embodiment 1 of the present invention.

FIG. 1 is a block diagram showing the structure of a map information processing device in accordance with Embodiment 1 of the present invention. Hereafter, an example in which the map information processing device is applied to a navigation device will be explained. This map information processing device is provided with a remote controller (abbreviated to as a "remote control" from here on) light receiving unit 11, a speed sensor 12, a GPS (Global Positioning System) receiver 13, an angular velocity sensor 14, a display unit 15, a voice output unit 16, and a navigation unit 17.

The remote control light receiving unit 11 receives a signal (an infrared ray or a radio wave) for commanding the navigation device to perform an operation, which is sent from a wireless remote control (not shown) operated by a user, and sends the signal received thereby to the navigation unit 17 as an operation signal.

The speed sensor 12 measures the speed of itself moving, and informs the speed to the navigation unit 17 as a speed signal. The GPS receiver 13 receives radio waves transmitted from GPS satellites, and sends the radio waves to the navigation unit 17 as GPS signals. The angular velocity sensor 14 measures a direction change of itself, and informs the direction change to the navigation unit 17 as a heading signal.

The display unit 15 is comprised of a liquid crystal display, for example, and displays a map image, a recommended route, and information, such as the remaining distance of a tunnel, according to an image signal sent thereto from the navigation unit 17.

The voice output unit 16 is comprised of a speaker, for example. According to a voice signal sent thereto from the navigation unit 17, the voice output unit 16 outputs a voice providing guidance to a destination according to the recommended route and a voice notifying the remaining distance of a tunnel, and also outputs a voice providing various pieces of information included in map information.

The navigation unit 17 is provided with a user operation input unit 21, a sensor information input unit 22, an HDD (Hard Disk Drive) 23, a RAM (Random Access Memory) 24, a navigation processing unit 25, an output control unit 26, and a control unit 27.

The user operation input unit 21 receives the operation signal sent thereto from the remote control light receiving unit 11, and sends the operation signal to the control unit 27. The sensor information input unit 22 receives the vehicle speed signal sent thereto from the speed sensor 12, the GPS signals sent thereto from the GPS receiver 13, and the heading signal sent thereto from the angular velocity sensor 14, and sends those signals to the control unit 27 as sensor information.

The HDD 23 corresponds to a map information storage unit in accordance with the present invention, and stores map information. The map information is represented by a graph structure in which each intersection is defined as a node and each road between intersections is defined as a link. A tunnel flag showing whether or not the road is a tunnel is added to each link. If the road is a tunnel, the tunnel flag is set to "1"; otherwise, the tunnel flag is set to "0". Furthermore, travel-enabled direction information showing directions in which a vehicle equipped with this map information processing device can travel is added to each link. The map information stored in this HDD 23 can be read by the control unit 27.

The map information storage unit in accordance with the present invention is not limited to the HDD. For example, the map information storage unit can be constructed of a disk drive device that reads map information stored in a recording medium, such as a DVD (Digital Versatile Disk) or a CD (Compact Disc).

The RAM 24 temporarily stores data used for various processes. For example, the map information read from the HDD 23 is written into the RAM 24 via the control unit 27. Furthermore, the map information stored in the RAM 24 can be read by the navigation processing unit 25 via the control unit 27.

The navigation processing unit 25 performs one of various processes to implement a navigation function according to a command from the control unit 27. For example, the navigation processing unit 25 performs a process for implementing a current position calculating function of detecting a current point by using the sensor information sent thereto from the sensor information input unit 22 via the control unit 27, and calculating a position on the road where this detected current point exists (simply referred to as a "current position" from here on) with reference to the map information read from the HDD 23 via the control unit 27, a map display function of creating a map image about a map of an area in the vicinity of the current position or an area including an arbitrary point, which is to be displayed on the display unit 15, a route determining function of determining a recommended route from the current position to an arbitrary point or between two arbitrary points, a route guiding function of providing guidance about a destination, a right or left turn or the like according to the recommended route determined by the route determining function, or the like. Each of these functions is implemented with reference to the map information stored in the HDD 23. The process results obtained by this navigation processing unit 25 are sent to the control unit 27.

The output control unit 26 generates an image signal according to the results of the navigation process sent thereto via the control unit 27 from the navigation processing unit 25 and sends the image signal to the display unit 15, and also generates a voice signal according to the results of the navigation process and sends this voice signal to the voice output unit 16.

The control unit 27 controls the whole of the navigation unit 17 by controlling transmission and reception of data among the user operation input unit 21, the sensor information input unit 22, the HDD 23, the RAM 24, the navigation processing unit 25, and the output control unit 26.

Next, the operation of the map information processing device in accordance with Embodiment 1 constructed as mentioned above will be explained with reference to flow charts shown in FIGS. 2 and 3, focusing on tunnel display processing of displaying information about tunnel exits.

First, main processing performed in the tunnel display processing will be explained with reference to the flow chart shown in FIG. 2. In the main processing, whether or not the tunnel flag of a link R1 corresponding to the current position is "1" is checked to see first (step ST11). More specifically, the navigation processing unit 25 calculates the current position by using a current position calculation function, and checks to see whether or not the tunnel flag added to the link R1 corresponding to the road where this calculated current position exists is "1". When, in this step ST11, determining that the tunnel flag of the link R1 is not "1", the navigation processing unit recognizes that the vehicle is not in any tunnel, and then enters a waiting state in which the map information processing device repeatedly carries out this step ST11.

In the waiting state in which the map information processing device repeatedly carries out this step ST11, when determining that the tunnel flag of the link R1 is "1", the navigation processing unit recognizes that the vehicle is in a tunnel and then calculates the distance D1 from the current position to the node of the link R1 in the traveling direction (step ST12). More specifically, the navigation processing unit 25 calculates the distance D1 from the current position to the node of the link R1 existing forward in the traveling direction with reference to the map information read from the HDD 23 via the control unit 27. This calculated distance D1 is stored in the navigation processing unit 25, and is referred to in tunnel distance calculation processing which will be carried out next.

The tunnel distance calculation processing of calculating the distance to a tunnel exit existing forward of the link R1 is then performed (step ST13). In this case, the link R1 and the distance D1 are informed to the tunnel distance calculation processing as arguments. The details of this tunnel distance calculation processing will be explained with reference to the flow chart shown in FIG. 3. In the flow chart shown in FIG. 3, the tunnel distance calculation processing is started in a state in which a reference link A and an accumulated tunnel distance B are specified as arguments. More specifically, in FIG. 3, the tunnel distance calculation processing is started in a state in which R1 and D1 specified in step ST13 of FIG. 2 are set as the arguments A and B.

In the tunnel distance calculation processing, whether a check of all the links connected to the node of the link A in the traveling direction has been completed is checked to see first (step ST21). More specifically, the navigation processing unit 25 refers to the map information read from the HDD 23 via the control unit 27 to check to see whether a check of all of the plurality of links connected to the node of the link A existing forward in the traveling direction has been completed. When it is determined, in this step ST21, that a check of all the links connected to the node of the link A in the traveling direction has been completed, the map information processing device returns the sequence to the main processing and, after that, ends the main processing.

In contrast, when it is determined, in step ST21, that a check of all the links connected to the node of the link A in the traveling direction has not been completed, the map information processing device then selects one of the yet-to-be-checked links (step ST22). More specifically, the navigation processing unit 25 selects one link from the plurality of links connected to the node of the link R1 existing forward in the traveling direction. In the following steps, this link selected is referred to as a link R2.

Whether the vehicle can travel through a road section corresponding to the link R2 along the traveling direction is then checked to see (step ST23). More specifically, the navigation processing unit 25 refers to direction information showing directions in which the vehicle is allowed to travel, the direction information being added to the link R2 selected in step ST22, to check to see whether the vehicle can travel through the road section corresponding to the link R2 along the traveling direction. When, in this step ST23, determining that the vehicle cannot travel through the road section corresponding to the link R2 along the traveling direction, the navigation processing unit returns the sequence to step ST21 and repeats the above-mentioned processes. As a result, any link corresponding to a road section or the like which prohibits vehicles from entering thereinto can be removed from the target for the processing.

In contrast, when it is determined, in step ST23, that the vehicle can travel through the road section corresponding to the link R2 along the traveling direction, whether or not the link R2 is the link A is then checked to see (step ST24). When, in this step ST24, determining that the link R2 is the link A, the navigation processing unit returns the sequence to step ST21 and repeats the above-mentioned processes. As a result, any link corresponding to a U-turn travel section in the tunnel is removed from the target for the processing.

When it is determined, in above-mentioned step ST24, that the link R2 is not the link A, whether or not the tunnel flag of the link R2 is "1" is then checked to see (step ST25). More specifically, the navigation processing unit 25 checks to see whether or not the tunnel flag added to the link R2 selected in step ST22 is "1".

When it is determined, in this step ST25, that the tunnel flag of the link R2 is "1", it is recognized that the node of the link R2 existing forward in the traveling direction is not an end point of the tunnel, the link length of the link R2 is added to the distance B to calculate a distance D2 (step ST26). More specifically, the navigation processing unit 25 adds the link length of the link R2 acquired from the map information to the distance B calculated in step ST12 of the main process. As a result, the distance D2 from the current position to the node of the link R2 existing forward in the traveling direction is calculated.

Tunnel distance calculation processing of calculating the distance to a tunnel exit existing forward of the link R2 is then performed (step ST27). At this time, the link R2 and the distance D2 are informed to the tunnel distance calculation process as arguments. This tunnel distance calculation processing is the same as the above-mentioned tunnel distance calculation process of calculating the distance to a tunnel exit existing forward of the link R1, with the exception that the link R2 and the distance D2 are used as arguments. After the tunnel distance calculation processing of calculating the distance to a tunnel exit existing forward of the link R2 of this step ST27 is completed, the navigation processing unit returns the sequence to the main processing and, after that, ends the main processing. When any end point of the tunnel is not detected in the tunnel distance calculation processing of calculating the distance to a tunnel exit existing forward of the link R2 of step ST27, the navigation processing unit similarly performs the tunnel distance calculation processing while increasing the nesting level of the tunnel distance calculation processing until detecting an end point of the tunnel.

When it is determined, in above-mentioned step ST25, that the tunnel flag of the link R2 is not "1", it is recognized that the node of the link R2 existing forward in the traveling direction is an end point of the tunnel, and the distance D2 is outputted as the distance to the tunnel end point (step ST28). More specifically, the navigation processing unit outputs the distance D2 calculated in step ST26 as the tunnel distance from the current position to the node of the link R2 existing forward in the traveling direction. When there is no branch in the tunnel, the distance D1 is outputted as the tunnel distance. After that, the navigation processing unit returns the sequence to step ST21 and then repeats the above-mentioned processing.

Figure 4:
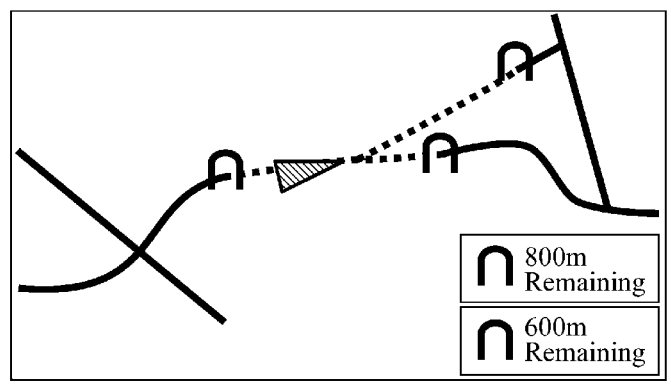
FIG. 4 is a view showing an example of a screen displayed by the map information processing device in accordance with Embodiment 1 of the present invention.

When the tunnel distance calculation processing is completed, a display of tunnel information is then produced (step ST14). More specifically, the navigation processing unit 25 sends data showing one or more tunnel distances acquired through the tunnel distance calculation processing to the output control unit 26 via the control unit 27. The output control unit 26 generates an image in which the one or more tunnel remaining distances shown by the received data showing the tunnel distance is superimposed onto a map, and sends the image to the display unit 15 as an image signal. As a result, as shown in FIG. 4, for example, the remaining distances to tunnel exits are displayed on a part of the screen of the display unit 15. In FIG. 4, although a display example in which the tunnel branches into two tunnel sections is shown, in a case in which the tunnel branches into three or more tunnel sections, the remaining distance to each of the exits of the three or more tunnel sections is displayed.

The output control unit 26 can be constructed in such a way as to further generate a voice signal according to the data showing the one or more received tunnel distances and send the voice signal to the voice output unit 16. As a result, the remaining distance to each tunnel exit is outputted by voice from the voice output unit 16.

As previously explained, because when the vehicle has entered a tunnel, the map information processing device in accordance with Embodiment 1 of the present invention displays the distance to each of all the tunnel exits even if the tunnel is a complicated tunnel which branches into tunnel sections therewithin, the psychological burden on the driver resulting from being unable to know the distance to any tunnel exit can be reduced.

Embodiment 2

A map information processing device in accordance with Embodiment 2 of the present invention is constructed in such a way as to, even when a vehicle equipped with this map information processing device is traveling through a tunnel which branches into tunnel sections, display only the distance to a tunnel endpoint included in a recommended route. The map information processing device in accordance with Embodiment 2 of the present invention has the same structure as that in accordance with Embodiment 1 shown in FIG. 1.

Next, the operation of the map information processing device in accordance with Embodiment 2 will be explained. Hereafter, it is assumed that a recommended route from a current position to a destination is determined using a route determining function of a navigation processing unit 25, and is stored in a RAM 24 as route data.

Figure 2:
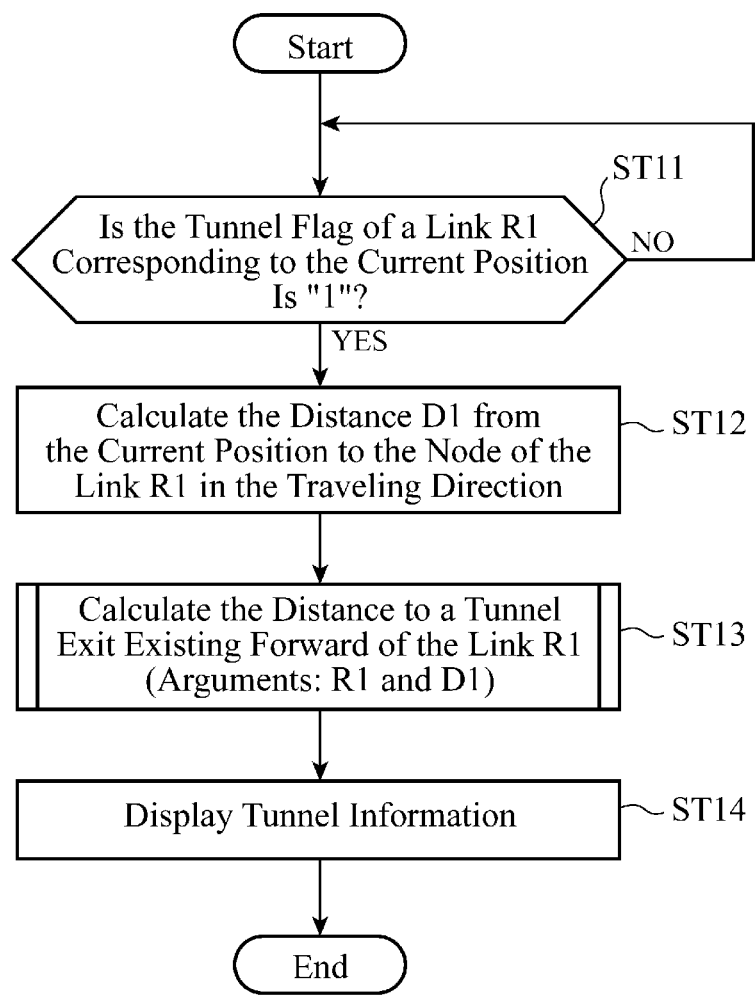
FIG. 2 is a flow chart showing main processing performed in tunnel displaying processing carried out by the map information processing device in accordance with Embodiment 1 of the present invention.
Figure 3:
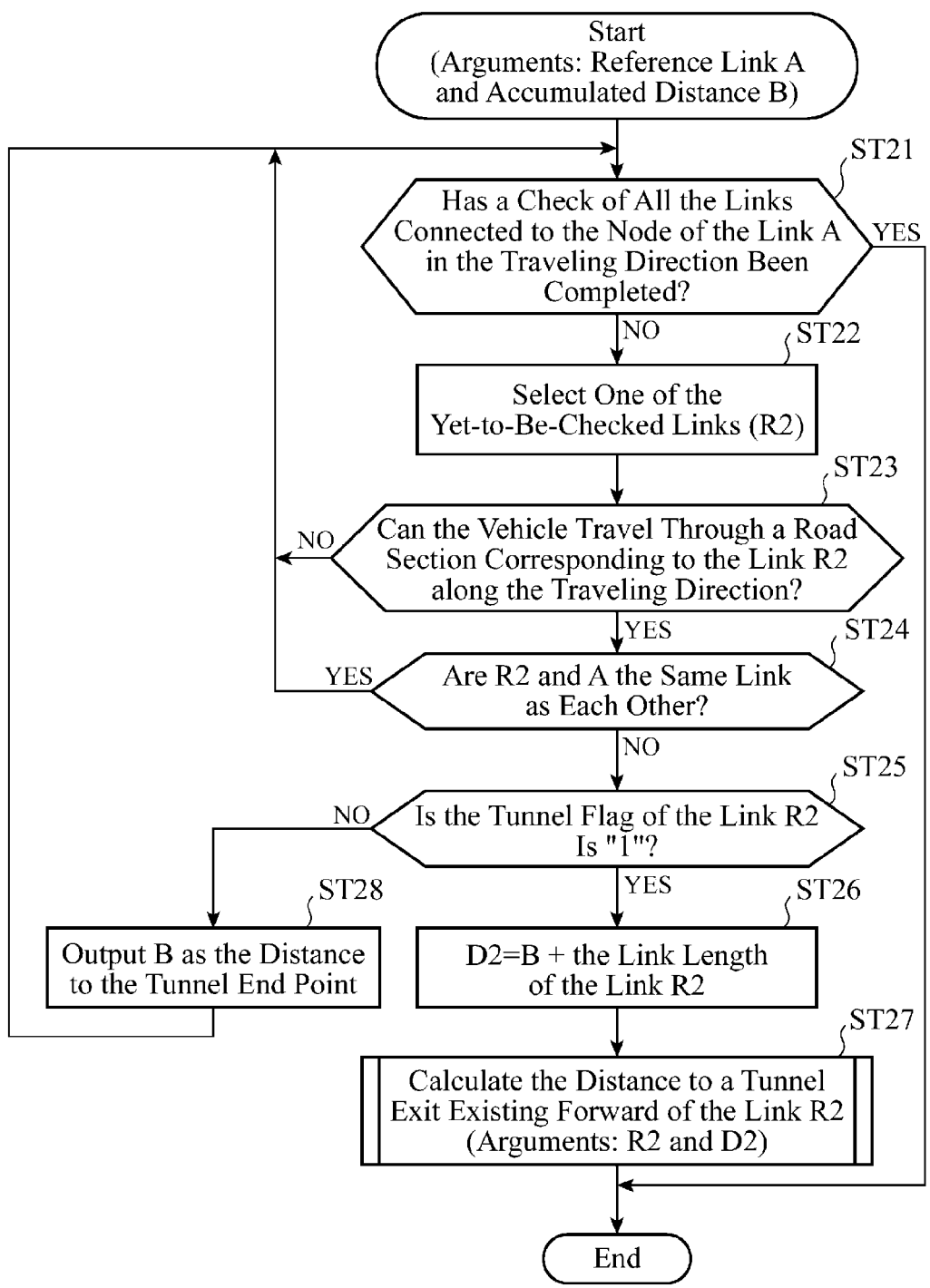
FIG. 3 is a flow chart showing tunnel distance calculation processing performed in the tunnel displaying processing carried out by the map information processing device in accordance with Embodiment 1 of the present invention.
Figure 5:
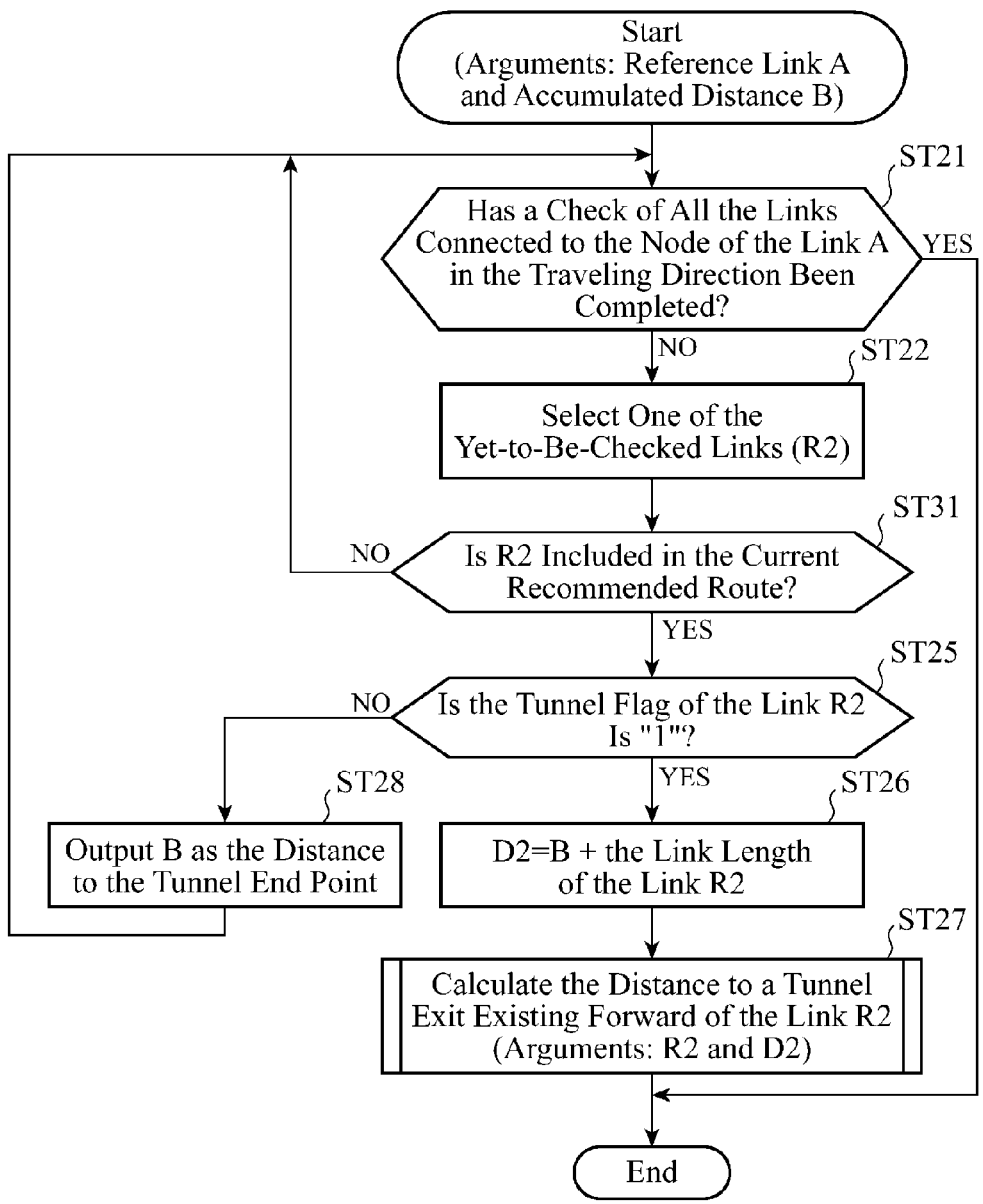
FIG. 5 is a flow chart showing tunnel distance calculation processing performed in tunnel displaying processing carried out by a map information processing device in accordance with Embodiment 2 of the present invention.

Main processing performed in tunnel display processing is the same as that shown in FIG. 2 and carried out by the map information processing device in accordance with Embodiment 1. FIG. 5 is a flow chart showing tunnel distance calculation processing performed in the tunnel display processing. Hereafter, steps in which the same processes as those of the tunnel distance calculation processing carried out by the map information processing device in accordance with Embodiment 1 shown in the flow chart of FIG. 3 or like processes are performed are designated respectively by the reference characters used in FIG. 3, and the explanation of the steps will be simplified.

In the tunnel distance calculation processing, whether a check of all the links connected to the node of a link A in the traveling direction has been completed is checked to see first (step ST21). When it is determined, in this step ST21, that a check of all the links connected to the node of the link A existing forward in the traveling direction has been completed, the navigation processing unit returns the sequence to the main processing and, after that, ends the main processing.

In contrast, when it is determined, in step ST21, that a check of all the links connected to the node of the link A in the traveling direction has not been completed, the navigation processing unit then selects one of the yet-to-be-checked links (step ST22). In the following steps, this link selected is referred to as a link R2.

Whether or not the link R2 is included in the current recommended route is then checked to see (step ST31). More specifically, the navigation processing unit 25 compares data about the link R2 selected in step ST22 with route data read from the RAM 24 via a control unit 27 to check to see whether or not this link R2 is included in the current recommended route. When, in this step ST31, determining that the link R2 is not included in the current recommended route, the navigation processing unit returns the sequence to step ST21 and repeats the above-mentioned processes. As a result, any links other than the links which construct the recommended route are removed from the target for the processing.

In contrast, when it is determined, in step ST31, that the link R2 is included in the current recommended route, whether or not the tunnel flag of the link R2 is "1" is then checked to see (step ST25). When it is determined, in this step ST25, that the tunnel flag of the link R2 is "1", it is recognized that the node of the link R2 existing forward in the traveling direction is not an end point of the tunnel, the link length of the link R2 is added to the distance B to calculate a distance D2 (step ST26). Tunnel distance calculation processing of calculating the distance to a tunnel exit existing forward of the link R2 is then performed (step ST27). After the tunnel distance calculation processing of calculating the distance to a tunnel exit existing forward of the link R2 of this step ST27 is completed, the navigation processing unit returns the sequence to the main processing and, after that, ends the main processing.

When it is determined, in above-mentioned step ST25, that the tunnel flag of the link R2 is not "1", it is recognized that the node of the link R2 existing forward in the traveling direction is an end point of the tunnel, and the distance B is outputted as the distance to the tunnel end point (step ST28). After that, the navigation processing unit returns the sequence to step ST21 and then repeats the above-mentioned processing.

Figure 6:
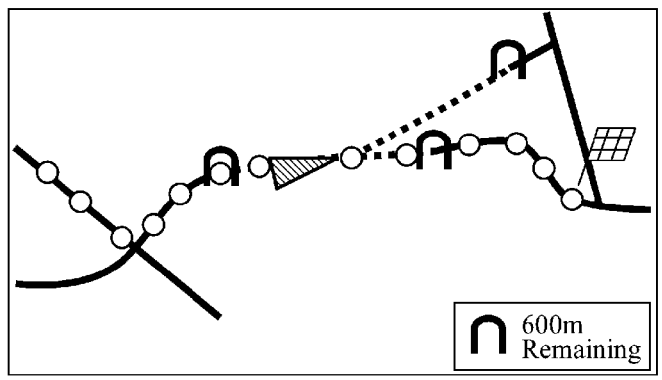
FIG. 6 is a view showing an example of a screen displayed by the map information processing device in accordance with Embodiment 2 of the present invention.

Through the above-mentioned processing, as shown in FIG. 6, for example, only the remaining distance to the tunnel exit on the recommended route (the road attached with a round mark) is displayed on a part of the screen of the display unit 15 even in a case in which the tunnel branches into two tunnel sections. The map information processing device can be constructed in such a way as to also output the distance to the tunnel exit by voice.

As previously explained, because when the vehicle has entered a tunnel in a state in which the vehicle is traveling along the recommended route, the map information processing device in accordance with Embodiment 2 of the present invention displays the remaining distance to the tunnel exit on the recommended route, the psychological burden on the driver resulting from being unable to know the distance to any tunnel exit can be reduced. Furthermore, because the map information processing device has only to calculate only the remaining distance to the single tunnel exit existing on the recommended route, the map information processing device can reduce the processing load compared with that in accordance with Embodiment 1.

Embodiment 3

A map information processing device in accordance with Embodiment 3 of the present invention is constructed in such a way as to, when a tunnel through which a vehicle equipped with this map information processing device is traveling branches into tunnel sections, display only the distance to a tunnel end point which the vehicle can reach after passing through a branch only once. The map information processing device in accordance with Embodiment 3 of the present invention has the same structure as that in accordance with Embodiment 1 shown in FIG. 1.

Figure 7:
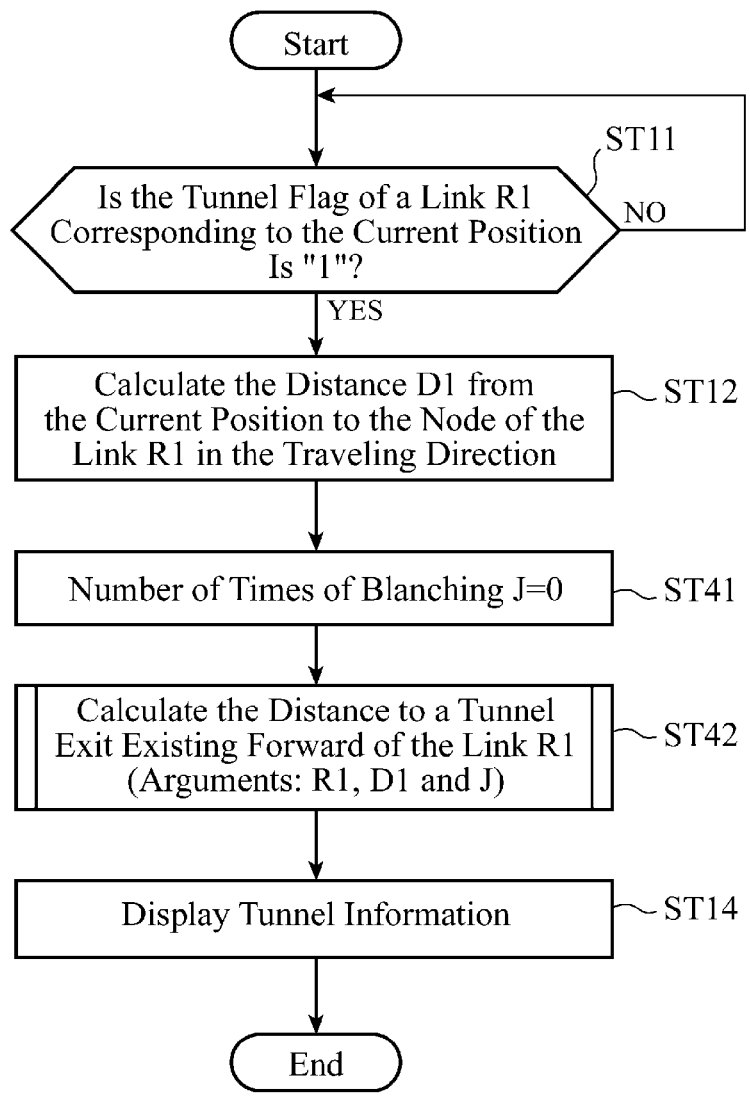
FIG. 7 is a flow chart showing main processing performed in tunnel displaying processing carried out by a map information processing device in accordance with Embodiment 3 of the present invention.
Figure 8:
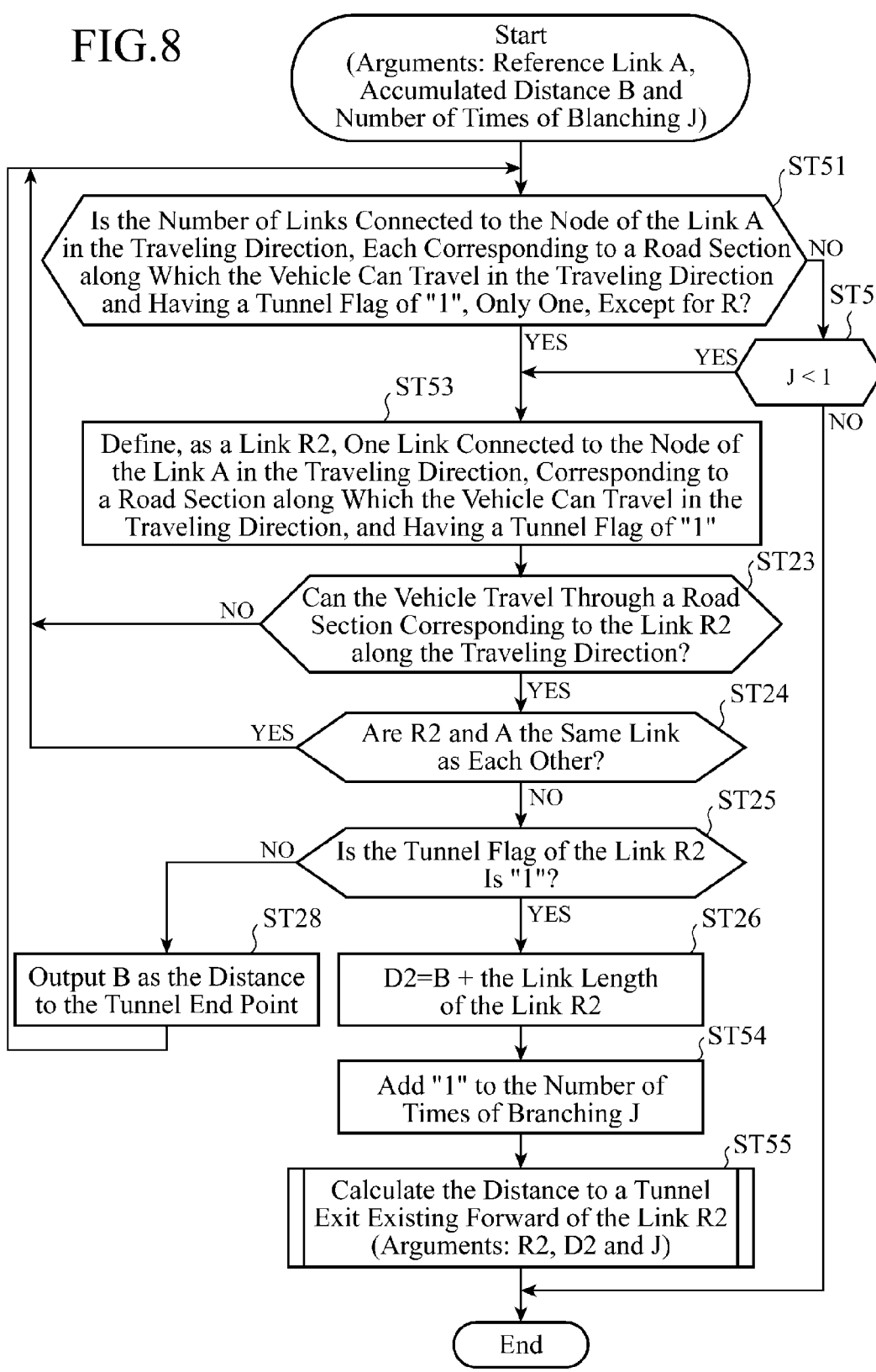
FIG. 8 is a flow chart showing tunnel distance calculation processing performed in the tunnel displaying processing carried out by the map information processing device in accordance with Embodiment 3 of the present invention.

Next, the operation of the map information processing device in accordance with Embodiment 3 will be explained with reference to flow charts shown in FIGS. 7 and 8, focusing on tunnel display processing of displaying information about tunnel exits.

First, main processing performed in the tunnel display processing will be explained with reference to the flow chart shown in FIG. 7. Hereafter, steps in which the same processes as those of the main processing carried out by the map information processing device in accordance with Embodiment 1 shown in the flow chart of FIG. 2 or like processes are performed are designated respectively by the reference characters used in FIG. 2, and the explanation of the steps will be simplified.

In the main processing, whether or not the tunnel flag of a link R1 corresponding to the current position is "1" is checked to see first (step ST11). When it is determined, in this step ST11, that the tunnel flag of the link R1 is not "1", the map information processing device recognizes that the vehicle is not in any tunnel, and then enters a waiting state in which the map information processing device repeatedly carries out this step ST11.

In the waiting state in which the map information processing device repeatedly carries out this step ST11, when determining that the tunnel flag of the link R1 is "1", the map information processing device recognizes that the vehicle is in a tunnel and then calculates the distance D1 from the current position to the node of the link R1 in the traveling direction (step ST12).

The number of times of branching J that the vehicle has passed through a branch in the tunnel is then set to "0" (step ST41). More specifically, a navigation processing unit 25 initializes the number of times of branching J which the navigation processing unit holds therein to "0".

Tunnel distance calculation processing of calculating the distance to a tunnel exit existing forward of the link R1 is then performed (step ST42). At this time, the link R1, the distance D1, and the number of times of branching J are informed to the tunnel distance calculation processing as arguments. The details of this tunnel distance calculation processing will be explained with reference to the flow chart shown in FIG. 8. Hereafter, steps in which the same processes as those of the tunnel distance calculation processing carried out by the map information processing device in accordance with Embodiment 1 shown in the flow chart of FIG. 3 or like processes are performed are designated respectively by the reference characters used in FIG. 3, and the explanation of the steps will be simplified.

In the tunnel distance calculation processing, whether or not the number of links connected to the node of the link A in the traveling direction, each of the links corresponding to a road section along which the vehicle can travel in the traveling direction and having a tunnel flag of "1", is only one is checked to see first (step ST51). More specifically, the navigation processing unit 25 refers to map information read from an HDD 23 via a control unit 27 to check to see whether or not there exists only one link which is connected to the node of the link A existing forward in the traveling direction, which corresponds to a road section along which the vehicle can travel in the traveling direction, and whose tunnel flag is "1".

When it is determined, in this step ST51, that the number of links each connected to the node of the link A in the traveling direction, each corresponding to a road section along which the vehicle can travel in the traveling direction, and each having a tunnel flag of "1" is only one, the navigation processing unit advances the sequence to step ST53. In contrast, when it is determined, in step ST51, that the number of links each connected to the node of the link A in the traveling direction, each corresponding to a road section along which the vehicle can travel in the traveling direction, and each having a tunnel flag of "1" is not only one, whether or not the number of times of branching J is smaller than "1" is then checked to see (step ST52). More specifically, the navigation processing unit 25 checks to see whether or not the number of times of branching J is "0".

When, in this step ST52, determining that the number of times of branching J is not smaller than "1", i.e. it is equal to or larger than "1", the navigation processing unit recognizes that the next branch is the second one, ends the tunnel distance calculation processing and returns the sequence to the main processing, and, after that, ends the main processing. In contrast, when, in step ST52, determining that the number of times of branching J is smaller than "1", the navigation processing unit recognizes that the next branch is the first one and advances the sequence to step ST53.

In step ST53, one link is selected from the links each connected to the node of the link A in the traveling direction, each corresponding to a road section along which the vehicle can travel in the traveling direction, and each having a tunnel flag of "1", and the selected link is defined as a link R2. More specifically, the navigation processing unit 25 defines, as the link R2, one of the links each connected to the node of the link A in the traveling direction, each corresponding to a road section along which the vehicle can travel in the traveling direction, and each having a tunnel flag of "1", and then performs the following processes.

Whether the vehicle can travel through a tunnel section corresponding to the link R2 along the traveling direction is then checked to see (step ST23). When, in this step ST23, determining that the vehicle can travel through the tunnel section corresponding to the link R2 along the traveling direction, the navigation processing unit returns the sequence to step ST51 and repeats the above-mentioned processes. Accordingly, any link corresponding to a tunnel section which prohibits the vehicle from entering thereinto can be removed from the target for the processing.

In contrast, when it is determined, in step ST23, that the vehicle can travel through the tunnel section corresponding to the link R2 along the traveling direction, whether the link R2 is the link A is then checked to see (step ST24). When, in this step ST24, determining that the link R2 is the link A, the navigation processing unit returns the sequence to step ST51 and repeats the above-mentioned processes. As a result, any link corresponding to a U-turn travel section in the tunnel is removed from the target for the processing.

In contrast, when it is determined, in step ST24, that the link R2 is not the link A, whether or not the tunnel flag of the link R2 is "1" is then checked to see (step ST25). When it is determined, in this step ST25, that the tunnel flag of the link R2 is "1", it is recognized that the node of the link R2 existing forward in the traveling direction is not an end point of the tunnel, the link length of the link R2 is added to the distance B to calculate a distance D2 (step ST26). "1" is then added to the number of times of branching J (step ST54). More specifically, the navigation processing unit 25 adds "1" to the number of times of branching J that the navigation processing unit is holding at that time.

Tunnel distance calculation processing of calculating the distance to a tunnel exit existing forward of the link R2 is then performed (step ST55). At this time, the link R1, the distance D1, and the number of times of branching J are informed to the tunnel distance calculation processing as arguments. This tunnel distance calculation processing is the same as the above-mentioned tunnel distance calculation processing of calculating the distance to a tunnel exit existing forward of the link R1, with the exception that the link R2, the distance D2 and the number of times of branching J are used as arguments. When, in this step ST55, determining that the number of times of branching J is not smaller than "1", the navigation processing unit returns the sequence to the main processing and, after that, ends the main processing.

When it is determined, in above-mentioned step ST25, that the tunnel flag of the link R2 is not "1", it is recognized that the node of the link R2 existing forward in the traveling direction is an end point of the tunnel, and the distance B is outputted as the distance to the tunnel end point (step ST28). After that, the navigation processing unit returns the sequence to step ST51 and then repeats the above-mentioned processes.

Figure 9:
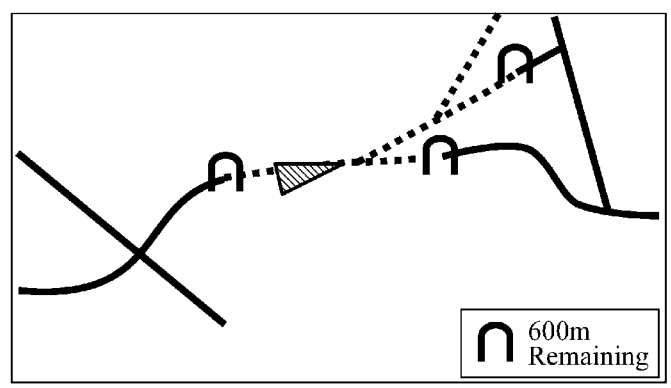
FIG. 9 is a view showing an example of a screen displayed by the map information processing device in accordance with Embodiment 3 of the present invention.

When the tunnel distance calculation processing is completed, a display of tunnel information is then produced (step ST14). As a result, as shown in FIG. 9, for example, only the distance to the tunnel end point which the vehicle can reach after passing through a branch only once is displayed on a part of the screen of the display unit 15. The map information processing device can be constructed in such a way as to also output the distance to the tunnel exit by voice.

As previously explained, because when the vehicle has entered a tunnel, the map information processing device in accordance with Embodiment 1 of the present invention displays only the distance to a tunnel end point which the vehicle can reach after passing through a branch only once, the psychological burden on the driver resulting from being unable to know the distance to any tunnel exit can be reduced. Furthermore, because the distance to any tunnel endpoint which the vehicle cannot reach after passing through a branch only once is excluded from the target for the calculation, the map information processing device can reduce the processing load compared with that in accordance with Embodiment 1.

Figure 10:
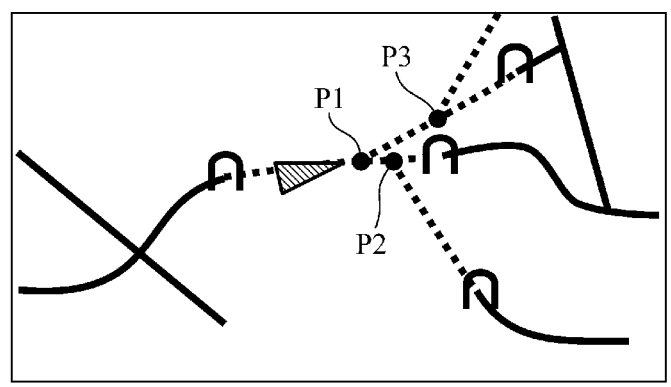
FIG. 10 is a view for explaining an operation of the map information processing device in accordance with Embodiment 3 of the present invention in a case in which each link branching off further branches into links.

In an example, as shown in FIG. 10, in which the vehicle is traveling through a tunnel branching into two links at a branch point P1, and one of the links further branching into two links at a branch point P2 and the other link further branching into two links at a branch point P3, the map information processing device in accordance with this Embodiment 3 does not display the distance to any tunnel exit at the current position. However, after that, when the vehicle is traveling forward along the tunnel section between the branch point P1 and the branch point P2, the map information processing device displays the remaining distance of the tunnel. Therefore, the psychological burden on the driver resulting from being unable to know the distance to any tunnel exit can be reduced.

Although the map information processing device in accordance with any one of above-mentioned Embodiments 1 to 3 is constructed in such a way as to display the distance to one or more tunnel exits or output the distance to the one or more tunnel exits by voice to inform the distance to the user, the map information processing device can be alternatively constructed in such a way as to display the time required to reach the one or more tunnel exits or output the time required to reach the one or more tunnel exits by voice to inform the required time to the user. In this case, the navigation processing unit 25 can be constructed in such a way as to calculate the time required to reach each tunnel exit by dividing the tunnel distance to each tunnel exit calculated through the above-mentioned processing by the speed included in the sensor information sent thereto, via the control unit 27, from a sensor information input unit 22.

INDUSTRIAL APPLICABILITY

Because when the vehicle has entered a tunnel, the map information processing device in accordance with the present invention can display the distance to each of all tunnel exits even if the tunnel is a complicated tunnel which branches into tunnel sections therewithin, the psychological burden on the driver resulting from being unable to know the distance to any tunnel exit can be reduced, the map information processing device in accordance with the present invention is suitable for use as a map information processing device which processes map information in a navigation device or the like, particularly as a map information processing device which outputs information about tunnel exits when the vehicle is traveling through a tunnel branching into tunnel sections therewithin, or the like.

The invention claimed is:

1. A map information processing device comprising:
   a map information storage unit for storing map information;
   a sensor information input unit for inputting sensor information used for calculation of a current position;
   a navigation processor for running a program to:
      calculate the current position by using the map information read from said map information storage unit, and the sensor information inputted from said sensor information input unit, and
      determine whether said calculated current position is in a tunnel which, as shown by said read map information, branches into alternative tunnel paths at a forward position, and
      when the determination is positive, calculate a distance to each of all tunnel end points for said alternative tunnel paths to generate a map image about a map including the calculated distances; and
   an output control unit for outputting the map image generated by said navigation processing unit.

2. A map information processing device comprising:
   a map information storage unit for storing map information;
   a user operation input unit for inputting a destination;
   a sensor information input unit for inputting sensor information used for calculation of a current position;
   a navigation processor for running a program to:
      calculate the current position by using the map information read from said map information storage unit, and the sensor information inputted from said sensor information input unit,
      determine a recommended route from this calculated current position to the destination inputted by said user operation input unit,
      determine whether said calculated current position is in a tunnel which, as shown by said read map information, branches into alternative tunnel paths at a forward position, and
      when the determination is positive, calculate only a distance to the one of the tunnel end points for said alternative tunnel paths which is on said determined recommended route to generate a map image about a map including the calculated distance; and
   an output control unit for outputting the map image generated by said navigation processing unit.

3. A map information processing device comprising:
   a map information storage unit for storing map information;
   a sensor information input unit for inputting sensor information used for calculation of a current position;
   a navigation processor for running a program to:
      calculate the current position by using the map information read from said map information storage unit, and the sensor information inputted from said sensor information input unit,
      determine whether that said calculated current position is in a tunnel which, as shown by said read map information, branches into alternative tunnel paths at a forward position,
      when the determination is positive, calculate a distance to each of the tunnel end points for said alternative tunnel paths which can be reached after a branch is passed through only once to generate a map image about a map including each calculated distance; and
   an output control unit for outputting the map image generated by said navigation processing unit.

* * * * *